United States Patent [19]
Ward et al.

[11] Patent Number: 4,823,032
[45] Date of Patent: Apr. 18, 1989

[54] END FRAME AND STATOR ASSEMBLY FOR A DYNAMOELECTRIC MACHINE

[75] Inventors: Robert W. Ward, Anderson; Rodney G. Hunter, Urbana; William E. Boys, Anderson, all of Ind.

[73] Assignee: General Motors Corporation, Detroit, Mich.

[21] Appl. No.: 226,707

[22] Filed: Aug. 1, 1988

[51] Int. Cl.⁴ ............................................. H02K 1/04
[52] U.S. Cl. ....................................... 310/43; 310/64; 310/90
[58] Field of Search ..................... 310/89, 254, 90, 91, 310/52, 58, 59, 43, 45, 64, 258

[56] References Cited
U.S. PATENT DOCUMENTS 3,252,020  5/1966  Consoli ................................. 310/64
4,546,280  10/1985  Pflüger ............................. 310/68 D
4,682,065  7/1987  English et al. ...................... 310/43

Primary Examiner—Patrick R. Salce
Assistant Examiner—Tien M. Nguyen
Attorney, Agent, or Firm—C. R. Meland

[57] ABSTRACT

An end frame and stator assembly for a dynamoelectric machine such as an alternating current generator. The assembly comprises a slotted stator core that supports a stator winding, a rotor bearing and a metallic heat dissipating insert that supports the bearing. The assembly has a plastic housing that is comprised of plastic material that is molded to the stator core and insert. The plastic housing does not encapsulate the stator winding. The metallic insert conducts heat away from the bearing and also adds stability to the plastic housing.

8 Claims, 2 Drawing Sheets

END FRAME AND STATOR ASSEMBLY FOR A DYNAMOELECTRIC MACHINE

This invention relates to an end frame and stator assembly for a dynamoelectric machine and more particularly to such an assembly wherein a plastic housing is molded to a stator assembly and to a bearing that is adapted to rotatably support a rotor shaft.

Diode-rectified alternating current generators for automotive use are well known to those skilled in the art, one example being the generator disclosed in the U.S. Pat. No. 4,604,538 to Merrill et al. In that patent a steel stator core is sandwiched between a drive end frame and a slip ring frame and both frames are formed of die cast aluminum. A bearing is assembled into each end frame. The drive end frame, after being die cast to shape, is machined to get the best fit for assembling the drive end bearing and aligning the inside diameter of the stator core as nearly concentric with the drive end bearing inside diameter as machined tolerances will permit.

The critical alignment of the bearing inside diameters and the stator core inside diameters are limited to the total of several machined tolerances. The aluminum used in the end frames amplifies both mechanical and magnetic noise from the alternating current generator.

The present invention relates to a drive end frame assembly wherein a plastic housing replaces the aluminum material and wherein this housing is molded to a stator assembly and to a bearing that is adapted to rotatably support a rotor shaft for the rotor of the alternating current generator. The use of a plastic housing for supporting a stator and a bearing is known. Thus, the U.S. Pat. No. 4,048,530 to Kaufman discloses an electric motor wherein a plastic housing supports a stator and rotor bearings. Further, the U.S. Pat. No. 4,352,897 to Ogata et al. discloses a stator assembly that is encapsulated by plastic material. The U.S. Pat. No. 3,002,261 to Avila et al. also discloses plastic encapsulation of a stator. In addition to the above-mentioned prior art, the U.S. Pat. No. 4,623,810 to Smith discloses a bearing supported by a plastic housing. In this patent a metallic heat sink is located between the plastic housing and the bearing to dissipate heat developed by the bearing.

This invention differs from the above-mentioned prior art in that, among other things, the stator winding is not encapsulated by the plastic material of the housing but rather is spaced from the plastic housing. This allows efficient and effective air cooling of the stator winding while still retaining the advantages of using a plastic housing that is molded to the stator assembly and rotor bearing. It accordingly is one of the objects of this invention to provide an end frame and stator assembly wherein a plastic housing is molded to the stator assembly and to a rotor bearing and wherein the plastic material does not cover nor encapsulate the stator winding to permit adequate air cooling of the stator winding.

Another object of this invention is to provide an end frame and stator assembly, of the type described, which includes a metallic insert for conducting heat away from the bearing. This insert is formed of aluminum and the plastic housing is molded to the insert. The insert, in addition to conducting heat away from the bearing, serves to add stability to the plastic housing structure. The insert has an annular rim that is provided with openings or passages that are aligned with the end turns of one end of the stator winding to permit cooling air to contact these end turns.

IN THE DRAWINGS

Figure 1:
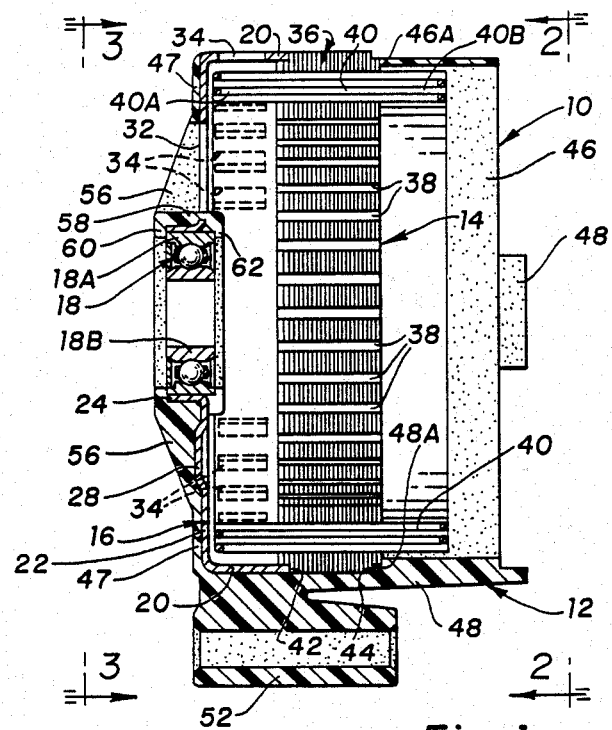
FIG. 1 is a sectional view of an end frame and stator assembly, made in accordance with this invention, taken along line 1—1 of FIG. 2.
Figure 2:
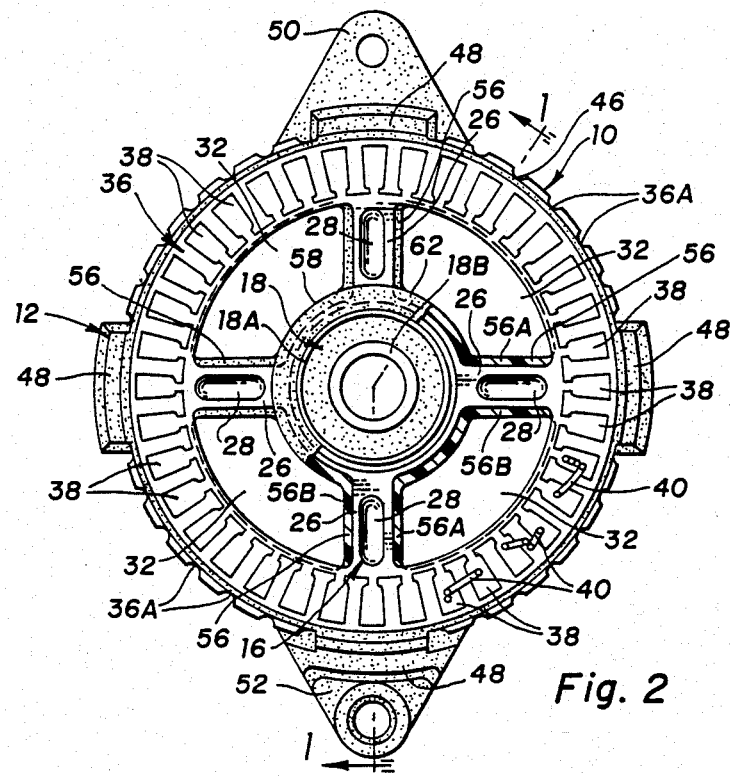
FIG. 2 is an end view of the end frame looking in the direction of the arrows 2—2 of FIG. 1.
Figure 3:
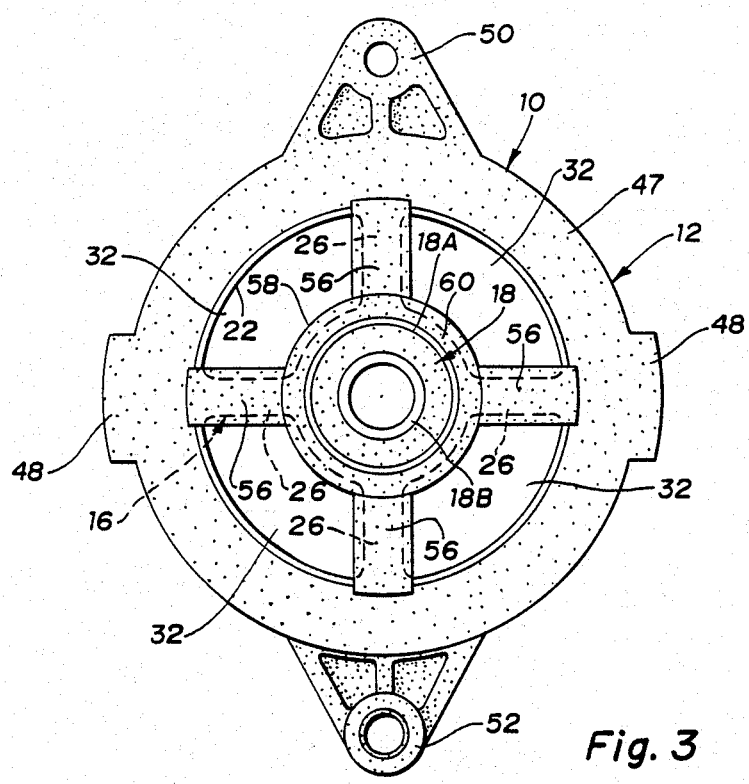
FIG. 3 is an end view of the end frame looking in the direction of arrows 3—3 of FIG. 1.

Referring now to the drawings, a drive end frame and stator assembly is illustrated which has been generally designated by reference numeral 10. This assembly comprises a housing 12 which is formed of plastic material that may be either thermoplastic or thermosetting. The housing 12 carries a stator assembly 14, a metallic insert 16 and a drive end ball bearing 18 having an outer race 18A and inner race 18B. As will be more fully described hereinafter the plastic material that forms the housing 12 is molded to stator assembly 14 to insert 16 and to bearing 18.

Figure 4:
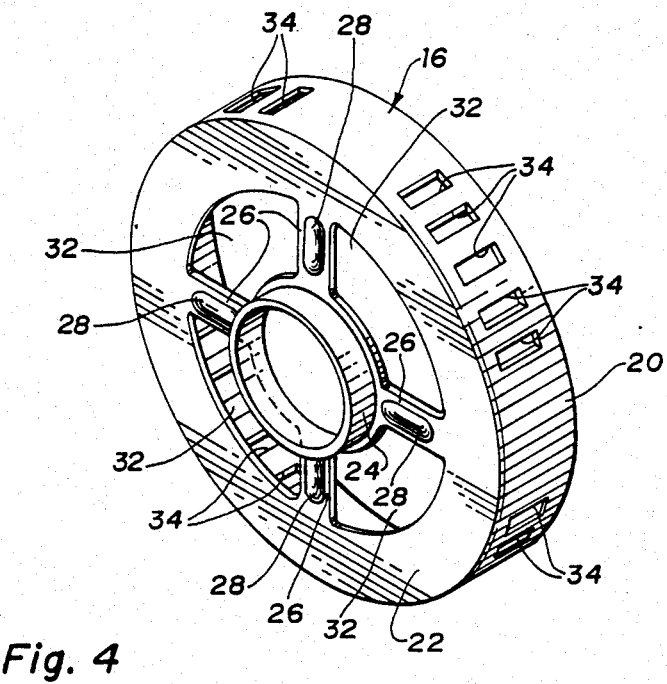
FIG. 4 is a perspective view of a metallic insert that forms a component of the end frame of this invention.

The insert 16 is formed of aluminum material that may be about 0.062 inches thick. It can be seen from FIG. 4 that insert 16 has an annular rim portion 20 and an annular end wall 22. The insert 16 further has a tubular portion 24 which supports the ball bearing 18. The outer race 18A of bearing 18 has a press-fit with the annular inner wall of tubular portion 24. The wall 22 and tubular portion 24 are connected by four radially extending webs, each designated as 26. Each web 26 has an outwardly formed bump or protrusion 28. These protrusions are concave on the inside and convex on the outside. The spaces between webs 26 define four openings, each designated as 32, for the passage of cooling air. Further, the rim 20 has a plurality of openings or passages 34 for the passage of cooling air. There are five passages 34 in an array or set of passages and four circumferentially spaced arrays or sets of five passages are utilized. If so desired, each array of five passages 34 can be replaced by a single slot or passage so that four single slots or passages would be used.

The stator assembly 14 is comprised of slotted stator core 36 that is formed of a stack of steel laminations that are welded together. The internal slots in the core 36 are designated as 38 and these slots have coils of wire that form a three-phase output of stator winding 40. Some of the end laminations of core 36 have a reduced diameter to thereby define annular two sided grooves or recesses 42 and 44. The winding 40 has end turns 40A and 40B. The stator core has a plurality of circumferentially spaced outer grooves 36A that are uniformly spaced throughout the circumference of the core 36. The grooves 36A extend the entire axial length of core 36.

The plastic housing 12 is a one-piece plastic part and it is molded to the parts that make up the end frame and stator assembly. Thus, the housing 12 is molded to insert 16 to stator assembly 14 and to portions of bearing 18. The housing 12 has an annular portion 46 and further has four axially extending rib portions 48. The rib portions 48 connect the annular portion 46 to an annular end wall portion 47. The portion 47 covers the end wall 22 of insert 16. Two of the ribs 48 have integral mounting lug portions 50 and 52. The inner portions of ribs 48 engage outer portions of core 36 and these inner portions fill the external grooves 36A of core 36 located beneath ribs 48. Further, portions 48A of ribs 48 fill or are located in arcuately extending portions of groove or recess 44. The outer surfaces of core 36, located between ribs 48, have no plastic material molded thereto. It can be seen, in FIG. 1, that an end portion 46A of tubular portion 46 engages an end surface of core 36.

The right end of insert 16 is located in groove 42 with an end surface of rim portion 20 engaging an annular surface of core 36. The air passages 34 are aligned with end turns 40A of stator winding 40.

The web portions 26 of insert 16 are covered by radially extending web portions 56. The web portions 56 connect annular portion 58 of housing 12 to portion 47 of housing 12. The portion 58 surrounds and engages tubular portion 24 of insert 16. Further, integral with portion 58 are annular portions 60 and 62 that engage the outer race 18A of ball bearing 18 to lock it in place. Portions of web portions 56 engage the outer convex surfaces of bumps or protrusions 28 to thereby prevent relative movement between housing 12 and insert 16. Web portions 56 have sidewalls 56A and 56B, portions of which engage side edges of webs 26 of insert 16.

The end frame and stator assembly that has been described is intended to be used as a component of an alternating current generator of the type disclosed in the above-referenced Merrill et al. patent. When so used it replaces the end frame and stator assembly shown in that patent, which are separate parts.

One of the purposes of the aluminum insert 16 is to conduct heat away from bearing 18. Thus, heat generated by bearing 18 is conducted to insert 16 via outer race 18A and tubular portion 24 of insert 16. The heat conducted to insert 16 is radiated by it to air that contacts the insert. In this regard, it is pointed out that portions of rim portion 20, that are located between ribs 48, are not covered by the plastic housing material of housing 12. These portions are therefore directly contacted by air. Further, when used with a generator of the type disclosed in the above-referenced Merrill et al. patent, air is pulled into slots 34 and expelled through openings 32. This air cools the left end turns 40A of stator winding 40 and since it contacts insert 16 it tends to cool it in regard to the heat that is conducted to the insert 16 from bearing 18. Another purpose of the insert 16 is to add stability to the end frame and stator assembly.

The plastic housing 12 does not encapsulate the winding 40 and no portion of housing 12 engages the winding 40. As can be seen in FIG. 1, the end turns 40A are spaced from insert 16 and end turns 40B are slightly spaced from tubular portion 46 of housing 12. The winding 40 accordingly can be directly contacted by cooling air. Thus, cooling of winding 40 does not depend upon heat conduction or transfer through any of the plastic material of housing 12.

It has been previously mentioned that the housing 12 may be formed of thermoplastic or thermosetting plastic material. One suitable thermoplastic material is an Allied Signal Inc. Petra-130 material which is a 30% glass filled polyester. A glass filled nylon material would also be suitable.

As has been previously mentioned, the plastic housing 12 is attached to the parts of the end frame and stator assembly by molding the plastic material of housing 12 to these parts. When molding the material of housing 12 to these parts the stator assembly 14 and the insert 16, with the bearing 18 assembled thereto, are placed in a mold. The mold is arranged such that the bearing 18 and the inside diameter of core 36 are concentric. The mold is further arranged to cause the plastic molding material to take the shape of housing 12 and to exclude plastic molding material from contacting winding 40. The molding is accomplished by injection molding wherein the plastic material is forced into the mold that contains stator assembly 14, insert 16 and bearing 18.

If so desired, and to simplify the molding operation, a steel ring may be welded to the right end of core 36 to aid in preventing plastic molding material from covering the outer surface areas of core 36 located between ribs 48 and for preventing molding material from entering the grooves 36A that are between ribs 48.

The embodiments of the invention in which an exclusive property or privilege is claimed are defined as follows:

1. An end frame and stator for a dynamoelectric machine comprising, a stator assembly having a metallic core formed of magnetic material that has a plurality of slots, a stator coil winding comprising conductors disposed in said slots, a bearing that is adapted to rotatably support a rotor shaft, and a one-piece plastic housing molded to portions of said metallic core and to an outer portion of said bearing to maintain said core and bearing in a predetermined fixed relationship, and for supporting said stator assembly and bearing, said housing and stator winding being so arranged that substantially no portion of said stator winding is encapsulated by said plastic housing.

2. The end frame and stator according to claim 1 where said stator winding is spaced at all exterior surfaces from said plastic housing.

3. The end frame and stator assembly according to claim 1 where said plastic housing has a tubular portion disposed about said bearing and has a plurality of radially extending web portions joined to said tubular portion, the spaces between said web portions providing air cooling passages.

4. The end frame and stator assembly according to claim 1 where said metallic core has outer axially extending grooves and wherein said plastic housing has axially extending rib portions engaging outer portions of said metallic core with inner portions of said rib portions disposed in certain of said grooves.

5. An end frame and stator for a dynamoelectric machine comprising, a stator assembly having a metallic core formed of magnetic material that has a plurality of slots, a stator coil winding comprising conductors disposed in said slots, a metallic insert having a tubular bearing support portion and a plurality of radially extending webs connecting said tubular bearing support portion to an annular rim portion, a bearing supported by said tubular bearing support portion, said webs extending generally normal to the longitudinal axis of said stator assembly, an end face of said rim portion of said insert engaging said metallic core, and a plastic housing molded to portions of said core to the webs and to said tubular bearing support portion of said insert, said metallic insert serving to conduct heat away from said bearing and to provide stability to said plastic housing.

6. The end frame and stator according to claim 5 where said rim portion of said insert is located adjacent and outwardly of certain end turns of said stator coil winding and wherein said rim portion has air cooling passages aligned with said end turns.

7. The end frame and stator according to claim 5 where said web portions of said insert have generally convex portions embedded in said plastic housing.

8. The end frame and stator according to claim 5 where said metallic insert has an annular portion located substantially normal to the longitudinal axis of said stator assembly and wherein said annular portion of said insert has plastic material of said plastic housing molded thereto.

* * * * *